United States Patent Office 3,325,374
Patented June 13, 1967

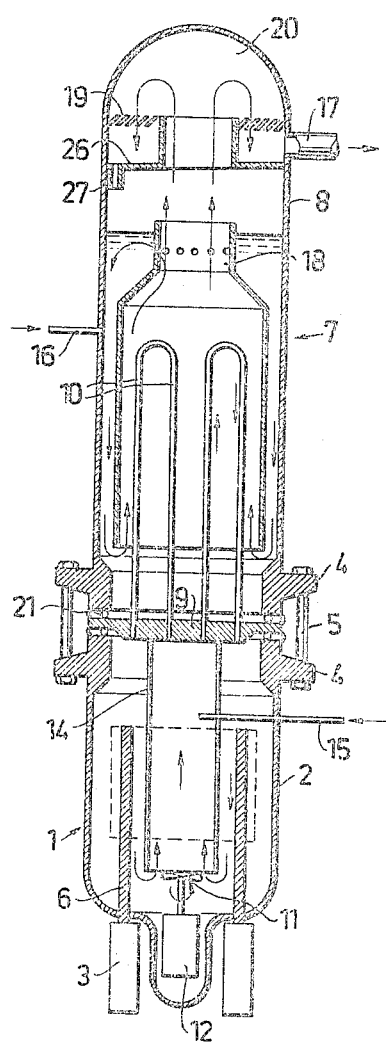
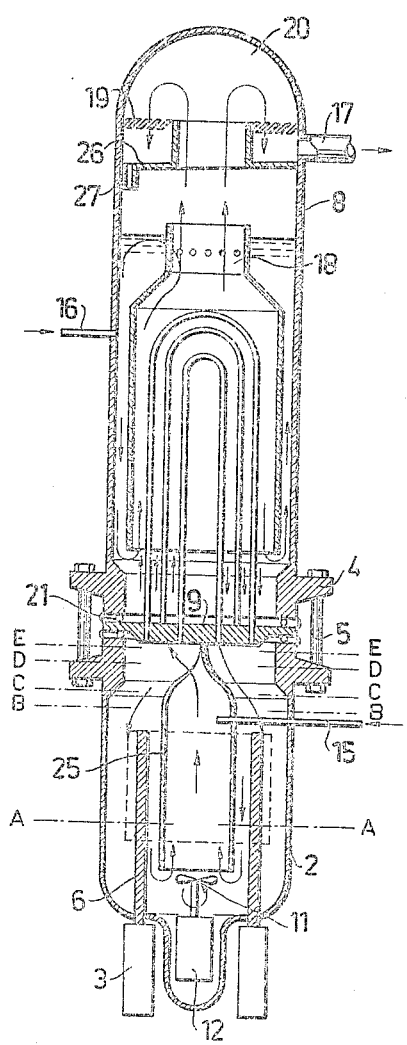

3,325,374
COMPACT NUCLEAR REACTOR AND INTEGRAL HEAT EXCHANGER ARRANGEMENT
Peter Heinrich Erwin Margen, Roslags-Nasby, Sweden, assignor to Aktiebolaget Atomenergi, Stockholm, Sweden, a Swedish company
Filed July 13, 1964, Ser. No. 382,023
Claims priority, application Sweden, July 19, 1963, 8,058/63
9 Claims. (Cl. 176—61)

The present invention relates to a nuclear reactor assembly containing a nuclear reactor of the pressurized water type using ordinary or heavy water provided with a pressure vessel having a lid and a heat exchanger of the type containing a tube plate into which both ends of the U-formed tubes are attached.

The main object of the invention is providing a compact assembly in which a nuclear reactor and a heat exchanger are joined to a unit without intermediate pipe connections. Another object of the invention is providing a nuclear reactor suitable for supplying moderate energy requirements, for instance for ship propulsion. Another object of the invention is providing a nuclear reactor which can be manufactured at a relatively low cost and in a standard design that is suitable for different kinds of consumers. Another object of the invention is providing a nuclear reactor of the pressurized water type which including the heat exchanger necessary for the generating of steam has such a low weight, so as to be liftable and transportable as a unit. Thereby it is not required to exchange fissile fuel at the consumer, but the reactor-heat exchanger unit can be transported to a central loading place, from which a unit having new fuel is transported to the consumer.

The nuclear reactor assembly according to the invention is characterized in that the tube plate of the heat exchanger forms the lid for the pressure vessel of the nuclear reactor. Thus the nuclear reactor and the heat exchanger are separated by a wall having the double function of being pressure vessel lid and tube plate. Hereby conduits between the reactor and the heat exchanger are avoided. For the circulation of the pressurized water in the reactor and the tubes of the heat exchanger a pump with a driving motor is suitably arranged in the pressure vessel of the reactor. Hereby outer conduits for the water circulation are avoided.

Figure 3:
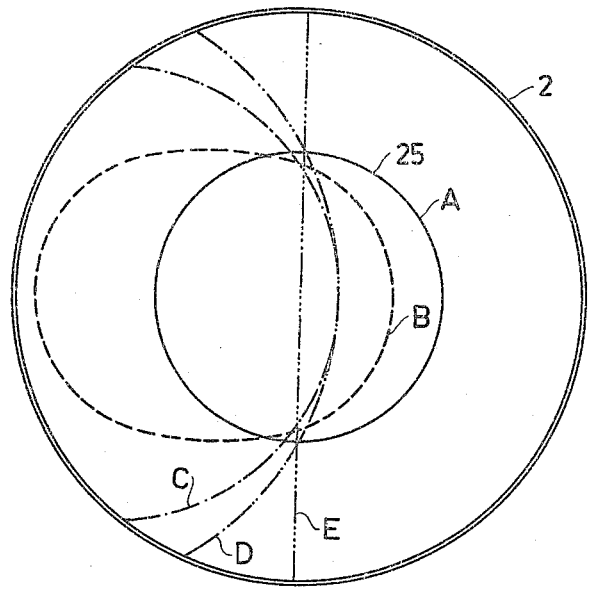
Figure 4:
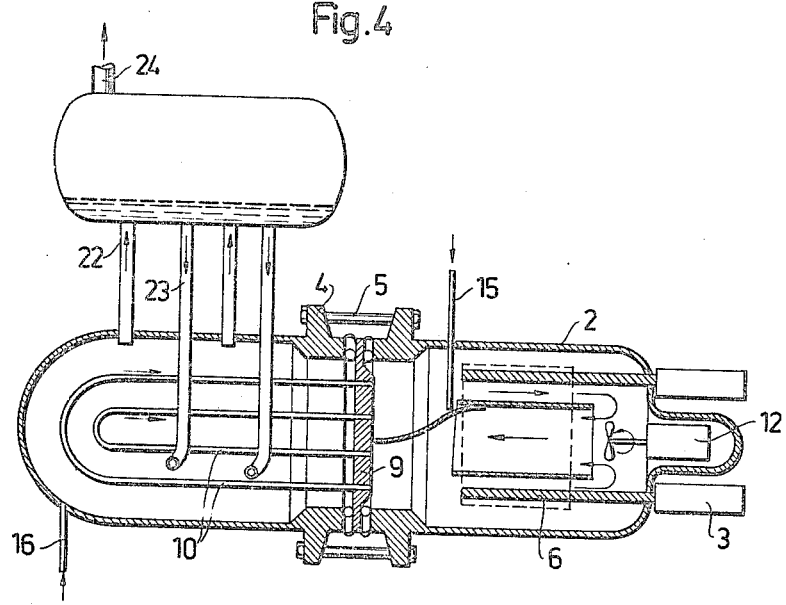

The invention will in the following be closer described with reference to the appended drawings. FIG. 1 shows an embodiment of the compact nuclear reactor according to the invention. FIG. 2 shows another embodiment. FIG. 3 shows sections through the reactor at different heights according to FIG. 2. FIG. 4 shows a third embodiment of the compact reactor according to the invention.

The device according to FIG. 1 contains a nuclear reactor generally indicated 1 and a heat exchanger generally indicated 7. The reactor has a cylindrical pressure vessel 2 having a plane lid 9. The hearth or core of the reactor is indicated with dashed lines. Control rods 6 are in a known manner arranged in the core. The control devices 3 for these control rods are situated under the pressure vessel. The pressure vessel also contains a pump 11 with a driving motor 12 and a partition wall in the form of a tube 14 extending from the lid 9 down through the hearth and ending at about the level of the pump 11. To the pressure vessel is furthermore a tube 15 connected being connected to a pressurizing assembly not shown by which the desired pressure is maintained in the pressure vessel in a known manner.

The heat exchanger 7 consists of a cylindrical pressure vessel 8 having a plane bottom 9 which forms the aforementioned lid of the reactor and being coaxial with the pressure vessel of the reactor. The lid 9 is at the same time tube plate, in that a plurality of U-formed tubes 10 are attached thereto. One end of each tube is attached to the part of the tube plate lying within the tubular intermediate wall 14 in the reactor vessel. The other end of each tube is attached to the surrounding annular part of the tube plate. The heat exchanger is provided with a conduit 16 for the supply of feed water and a conduit 17 for the outlet of steam and contains a first water separator 18 of a known type. The upper part 20 of the heat exchanger acts as a steam dome and contains a second water separator 19 and a bottom 26 for the separated water, the bottom being provided with an outlet pipe 27.

The tube plate 9 is clamped between the pressure vessels of the reactor and the heat exchanger by means of flanges 4 provided on said vessels and bolts 5. The pressure vessel of the reactor is suitably made of a radiation resistant material, for instance stainless steel, as then no separate radiation shield is needed between the hearth and the pressure vessel. The pressure vessel of the heat exchanger is not subjected to radiation and is suitably made of carbon steel or low alloy steel. To have different materials in the pressure vessels causes different expansions, the flange connection therefore being contracted in such a known manner so as to admit radial movement between the tube plate and the flanges, for instance by means of roller bearings 21.

The pump 11 forces the pressurized water through the reactor and the tubes in the direction indicated by the arrows. The water in the heat exchanger is heated to boiling and flows by self-circulation as indicated by the arrows. The generated steam passes through the first separator 18 where most of the water is separated and then through the second separator where the remaining water is removed. The steam leaves the heat exchanger through the conduit 17. The attachment of the tubes in the tube plate shown in FIG. 1 presents certain problems out of a constructional point of view and by the mounting. A preferred attachment of the tubes is shown in FIGS. 2 and 3. The circular tube plate is here divided into two semicircular parts in such a manner, that one end of each tube is connected to one of the semicircular parts and the other end of the tube to the other semicircular part. The partition wall 25 controlling the flow of the pressurized water in the reactor is, therefore, essentially plane close to the tube plate so as to separate the two semicircular parts from each other, see section E—E in FIG. 3. Further down the intermediate wall becomes more and more curved, see sections D—D and C—C, and finally it changes into a tube, see sections B—B and A—A, the tube extending through the reactor hearth. Theoretically the intermediate wall as a whole could have the form of a plane plate vertically extending through the reactor hearth, but the illustrated tubular form among other things has the advantage of being more resistant to the pressure difference generated by the circulation pump for the pressurized water. The embodiment described above has several advantages. By placing the reactor between the pump and the heat exchanger and by using U-formed tubes a space is created for steam above the water level on the secondary side. This makes possible internal steam-water separation and self-circulation. The U-tubes will not be subjected to thermal stresses as they are free to expand when heated.

The reactor assembly shown in FIGS. 1 and 2 is relatively high. FIG. 4 shows a horizontally arranged assembly where the reactor, the tubes and the tube plate are of the type shown in FIG. 1. However, as the steam dome ought to lie higher than the heat exchanger it is formed as a separate tank 20 lying above the heat exchanger and being connected thereto by four pipes, the water flowing upwardly through the tubes 22 and downwardly through the tubes 23. The produced steam leaves the tank through conduit 24.

I claim:
1. A nuclear reactor assembly, comprising
   a first pressure vessel;
   nuclear fuel in said first pressure vessel;
   water in said first pressure vessel to be heated by said nuclear fuel;
   a second pressure vessel adjacent said first pressure vessel;
   flanges on the confronting ends of the two pressure vessels;
   a plurality of securing members interconnecting said flanges;
   a partition between said first and second pressure vessels, the edge portion of said partition engaging the confronting ends of the two pressure vessels in a manner to be clamped therebetween;
   a first set of openings in said partition;
   a second set of openings in said partition;
   a plurality of U-shaped heat-exchanger tubes in said second pressure vessel;
   one end of each U-shaped heat-exchanger tube being connected to one opening of said first set of openings the other end of each U-shaped heat exchanger tube being connected to one opening of said second set of openings;
   means for supplying to said second pressure vessel a fluid to be heated by contact with said heat exchanger tubes;
   means for withdrawing fluid thus heated from said second pressure vessel;
   baffle means in said first pressure vessel separating said first set of openings from said second set of openings thereby creating an upcomer zone and a downcomer zone; and
   a pump in said first pressure vessel adapted to circulate the water from the downcomer zone to the upcomer zone via the nuclear fuel and through the U-shaped heat-exchanger tubes in heat-exchanging contact with the fluid in said second pressure vessel.

2. Nuclear reactor assembly according to claim 1, in which said second pressure vessel is provided with means for supplying water to, and means for withdrawing steam from, said second pressure vessel.

3. Nuclear reactor assembly according to claim 1, in which said first pressure vessel of the nuclear reactor contains also a driving motor for said pump.

4. Nuclear reactor assembly according to claim 1, in which said heat-exchanger comprises a tube plate and in which said baffle means is tubular and divides the tube plate of the heat exchanger in an inner, circular part, to which one end of each of the tubes is attached, and an outer annular part to which the other end of each of the tubes is attached.

5. Nuclear reactor assembly according to claim 4, in which at least the part of the baffle means adjacent the tube plate is essentially plane and divides the tube plate into two essentially uniform parts, one end of each of the tubes being attached to one of the two uniform parts, and the other end of each of the tubes being attached to the other one of the two uniform parts.

6. Nuclear reactor assembly according to claim 5, in which said baffle means is so curved that the essentially plane part being close to the tube plate changes to a tubular part.

7. Nuclear reactor assembly according to claim 1, in which said partition is disposed at the top of said first pressure vessel, the heat exchanger tubes extending vertically above said pressure vessel.

8. Nuclear reactor assembly according to claim 7, in which the pump is placed in the lower part of said first pressure vessel.

9. A nuclear reactor assembly, comprising
   a first cylindrical vessel;
   nuclear fuel contained in a core in said first pressure vessel;
   water in said first pressure vessel to be heated by said nuclear fuel;
   a second cylindrical pressure vessel adjacent said first pressure vessel;
   a circular partition between said first and second pressure vessels;
   a first set of openings in said partition; all openings of this first set being situated on the same side of one diameter of the circular partition;
   a second set of openings in said partition, all openings of this second set being situated on the opposite side of said diameter of the circular partition;
   a plurality of U-shaped heat-exchanger tubes in said second pressure vessel;
   one end of each U-shaped heat-exchanger tube being connected to one opening of said first set of openings the other end of each U-shaped heat exchanger tube being connected to one opening of said second set of openings;
   means for supplying to said second pressure vessel a fluid to be heated by contact with said heat exchanger tubes;
   means for withdrawing fluid thus heated from said second pressure vessel;
   baffle means in said first pressure vessel said baffle means comprising a first plane zone adjacent the partition and extending along said diameter of the partition, a second zone curving gradually from a plane shape into a cylindrical shape, and a third zone having a cylindrical shape and extending through the reactor core, said baffle thus creating in the first pressure vessel an upcomer zone communicating with the first set of openings in the partition and a downcomer zone communicating with the second set of openings in the partition; and
   a pump in said first pressure vessel adapted to circulate the water from the downcomer zone to the upcomer zone via the nuclear fuel and through the U-shaped heat-exchanger tubes in heat-exchanging contact with the fluid in said second pressure vessel.

References Cited

UNITED STATES PATENTS

| 2,862,479 | 12/1958 | Blaser et al. | |
| 2,865,827 | 12/1958 | Dwyer | 176—55 X |
| 3,202,584 | 8/1965 | Bogaardt et al. | 176—61 |
| 3,213,833 | 10/1965 | Cunningham et al. | 122—34 |

FOREIGN PATENTS

| 800,385 | 8/1958 | Great Britain. |
| 835,266 | 5/1960 | Great Britain. |

L. DEWAYNE RUTLEDGE, *Primary Examiner.*